United States Patent [19]

Izumi et al.

[11] Patent Number: 4,887,094

[45] Date of Patent: Dec. 12, 1989

[54] THERMAL RECORDING APPARATUS

[75] Inventors: Masaki Izumi; Tsutomu Miura, both of Tokyo, Japan

[73] Assignee: Eastman Kodak Company, Rochester, N.Y.

[21] Appl. No.: 288,207

[22] Filed: Dec. 22, 1988

[30] Foreign Application Priority Data

Apr. 27, 1988 [JP] Japan ................................ 63-105329

[51] Int. Cl.⁴ ............................................ G01D 15/10

[52] U.S. Cl. ................................ 346/76 PH; 400/120

[58] Field of Search .................... 346/76 PH; 400/120

[56] References Cited

FOREIGN PATENT DOCUMENTS 0137669 7/1985 Japan .............................. 346/76 PH 0032059 2/1987 Japan .............................. 346/76 PH

*Primary Examiner*—B. A. Reynolds

*Assistant Examiner*—Huan Tran

*Attorney, Agent, or Firm*—Raymond L. Owens

[57] ABSTRACT

A thermal recording apparatus is provided with a recording head and a sheet of recording paper shiftable relative to each other in a direction parallel to a row of heating elements through a distance which is smaller than the pitch of the heating elements, whereby the transfer process which has in the past been completed in one step is carried out in a multiplicity of steps. Accordingly, it is possible to obtain an image of higher density than can be obtained in the prior art.

1 Claim, 2 Drawing Sheets

THERMAL RECORDING APPARATUS

BACKGROUND OF THE INVENTION

1. Field of the Invention

The present invention relates to a thermal recording apparatus wherein a sheet of recording paper is supported adjacent to a recording head having a row of heating elements and these elements are heated electrically and on the basis of information concerning a given image. This heating transfers ink or dye from an ink layer of a transfer recording medium to the sheet of recording paper. If the sheet of recording paper is of the type which contains a color developing medium the heating results in an image directly formed on the sheet. A linewise image is thus formed by the row of heating elements. The same operation is repeated while the recording paper is moved in a direction substantially perpendicular to the row of heating elements, thus effecting recording over the entire surface of the sheet.

2. Description of the Prior Art

With the increasingly wide use of the thermal recording, there has recently been a rising demand for a technique allowing images of higher density to be obtained. In general, it is possible to enhance the density of reproduced images by increasing the number of heating elements that constitute a recording head so that the pitch of the heating elements is made as small as possible. However, if the number of heating elements is increased, the production cost of the recording head rises and the interference of heat between the heating elements increases. There has therefore been a restricted ability to achieve higher image density.

SUMMARY OF THE INVENTION

In view of the above-described circumstances, it is a primary object of the present invention to provide a thermal recording apparatus which employs a general-purpose inexpensive recording head and yet is capable of obtaining an image of higher density than what can be obtained by the prior art.

To this end, the present invention provides a thermal recording apparatus which is provided with means for shifting a recording head and a sheet of recording paper relative to each other in a direction parallel to the row of heating elements through a distance which is smaller than the pitch of the heating elements, whereby the transfer process which has heretofore been completed in one step is carried out in a multiplicity of steps with the recording head being shifted between each of these steps.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like members, and of which.

DESCRIPTION OF THE PREFERRED EMBODIMENTS

The present invention will be described hereinunder in detail with reference to the accompanying drawings.

Figure 1:
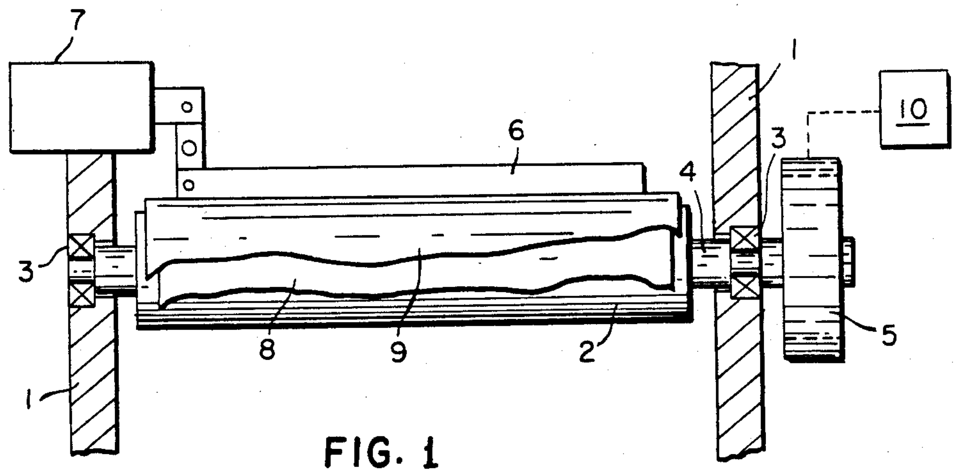
FIG. 1 shows a platen roller and members associated therewith in one embodiment of the thermal recording apparatus according to the present invention.

Referring first to FIG. 1, which shows one embodiment of the present invention, the reference numeral 1 denotes a frame of a thermal recording apparatus. In this embodiment, the means for supporting a sheet of recording paper is a platen roller 2 which is rotatably supported on the frame 1 through bearings 3. A driving pulley 5 is secured to one end of a shaft 4 of the platen roller 2. Thus, the platen roller 2 is rotated by a known driving means 10 through the pulley 5.

Figure 2:
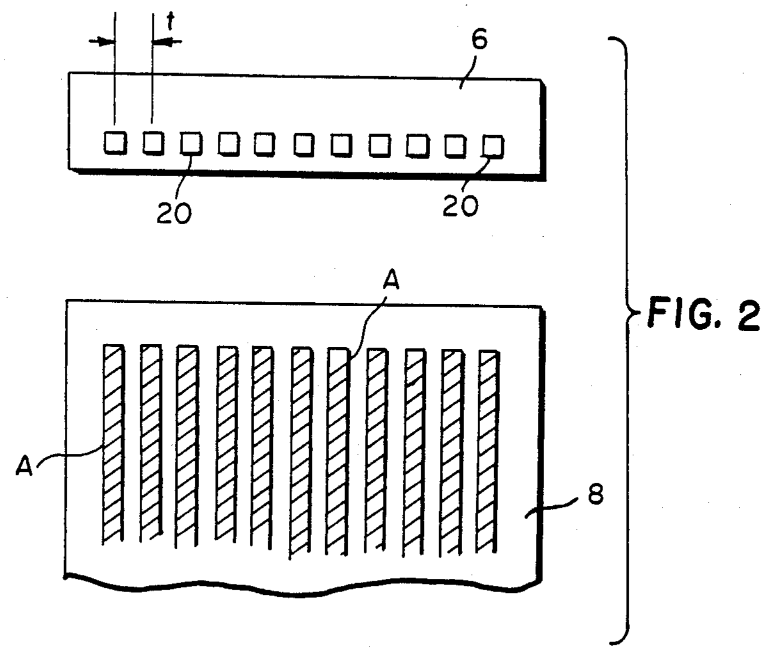
FIG. 2 shows the way in which a first step of a transfer process is carried out with the apparatus shown in FIG. 1.

A recording head 6 is provided in close proximity and parallel to the platen roller 2. The head 6 is movable in its longitudinal direction (which will be referred to as the "main scanning direction") by the action of a solenoid 7 which is one example of a shifting means, as described later in detail. A sheet of recording paper 8 is supported on the platen roller 2. A transfer recording medium 9 is interposed between the sheet 8 and the recording head 6. As shown in FIG. 2, the recording head 6 has a row of heating elements 20 arranged in the main scanning direction. Current pulses are selectively applied to the heating elements 20 in accordance with data concerning a given image, and ink is transferred from the recording medium 9 to the sheet 8 at portions which correspond to the heating elements 20 which are selectively heated by the application of current pulses. It should be noted that in FIGS. 2 and 3, the pitch of the heating elements 20, is shown to be greater than the actual pitch for the sake of illustration. When a sheet of recording paper which contains a color developing medium is used no transfer recording medium 9 is employed and the receiving sheet is brought into direct contact with the recording head 6.

The driving means 10 causes the platen roller 2 to rotate either continuously at a constant speed which is determined by the timing at which current pulses are selectively applied to the heating elements 20, or intermittently, i.e., following each time transfer for one line in the main scanning direction is effected, thereby moving the sheet of recording paper 8 in a direction (generally know as "subscanning direction") substantially perpendicular to the main scanning direction. The driving means 10 may also be arranged such that the means for supporting a sheet of recording paper is immovable and the sheet is directly driven by means, for example, of a sprocket, as is well known.

The recording head 6 is movable by the action of the solenoid 7 between an initial position and a position which is shifted from the initial position in the main scanning direction by a distance which is shorter than the pitch (t) of the heating elements 20 (see FIG. 2). In this embodiment, the shift distance is one half of the pitch of the heating elements 20.

The operation of the foregoing embodiment will next be described.

Figure 3:
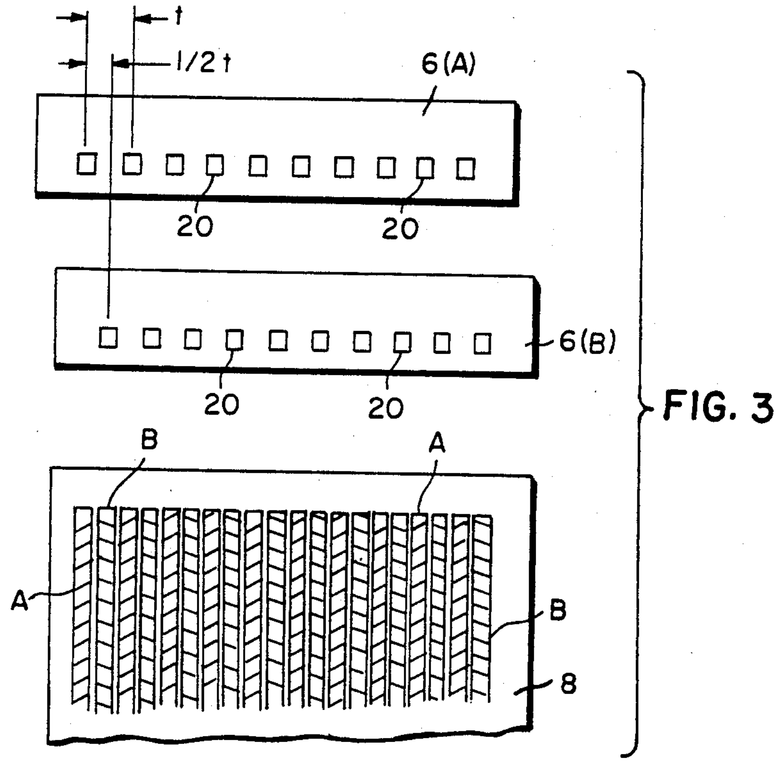
FIG. 3 shows the way in which a second step of a transfer process is carried out with the apparatus shown in FIG. 1.

The platen roller 2 is first rotated one full turn by the operation of the driving means 10, and transfer is thereby effected over the entire surface of the sheet of recording paper 8. The sheet 8 in this state is shown in FIG. 2, wherein the reference symbol A denotes first transfer regions. Then, the recording head 6 is shifted rightward as viewed in the figure by the time the platen roller 2 reaches the starting point of the first step of transfer process, and then a second step of the transfer process is carried out in a manner similar to the above. The sheet of recording paper 8 in this state is shown in FIG. 3. In FIG. 3, the second transfer regions are denoted by B, while the positions of the recording head 6 in the first and second steps of the transfer process are denoted by 6(A) and 6(B), respectively. Although in this embodiment the shift distance is one half of the pitch (t) of the heating elements 20, the shift distance may be selected as desired. For example, the shift distance may be t/N (N is 3 or more). In such a case, transfer is carried out N times to complete one perfect transfer process.

Although in the foregoing embodiment the recording head 6 is shifted by the shifting means every time the platen roller 2 rotates one full turn, the transfer process may be conducted adopting the following procedure. Namely, one line in the main scanning line can be first subjected to a first step of the transfer process with the recording head 6 disposed at a first position, and the shifting means can then be activated to move the head 6 to a second position so as to carry out a second step of the transfer process for the same line, thereby completing the transfer process for this line. Next, the sheet of recording paper 8 is moved in the subscanning direction to carry out a similar transfer process for the ensuing line.

In the case of multicolor printing, the above-described transfer process is first conducted for one color, and then the recording head 6 returned to the initial position to repeat the same transfer operation with respect to another color.

Figure 4:
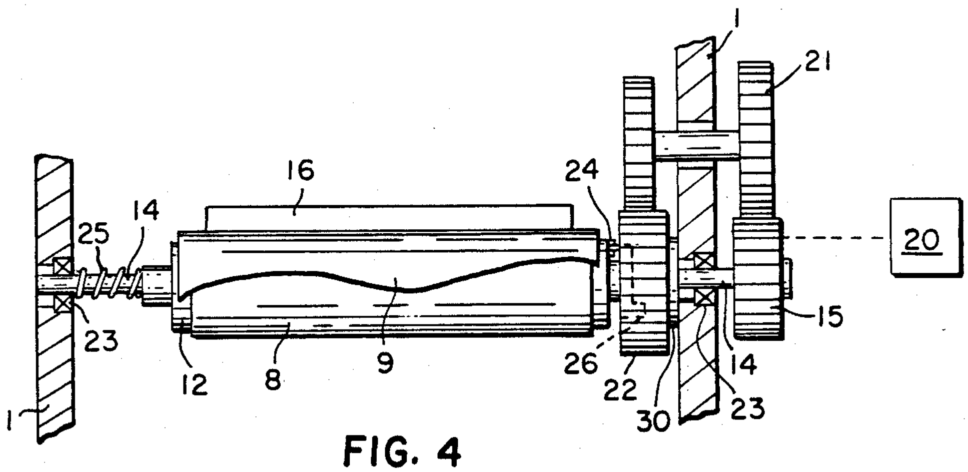
FIG. 4 shows a platen roller and members associated therewith in another embodiment of the thermal recording apparatus according to the present invention.

FIG. 4 shows another embodiment of the present invention. The shifting means in this embodiment is arranged to shift a platen roller 12. More specifically, the shifting means includes a compression spring 25 which is provided around one end portion of a shaft 14 of the platen roller 12. A gear 15 is secured to the other end of the shaft 14. The gear 15 is caused to rotate the platen roller 12 by the action of driving means 20. The rotation of the gear 15 is also transmitted to a cam gear 22 through a gear train 21. The gear ratio of the gear train 21 is selected so that the cam gear 22 rotates a half turn per revolution of the platen roller 12. Accordingly, the cam gear 22 is adapted to rotate relative to the shaft 14 of the platen roller 12. The cam gear 22 is also movable relative to the platen roller 12. The cam gear 22 is also movable relative to the platen roller 12 in the axial direction, but the cam gear 22 is prevented from moving at least rightward as viewed in the figure by means of a thrust bearing 30 which is disposed between the cam gear 22 and the frame 1. A cam groove 26 is formed in the end face of the cam gear 22 which is closer to the platen roller 12, while a follower roller 24 is provided on the platen roller 12. In this embodiment, bearings 23 allow axial movement of the shaft 14 and therefore the position of the platen roller 12 is determined by the depth of the cam groove 26 at a particular position where the follower roller 24 is in contact with the cam groove 26. The cam groove 26 comprises a raised portion which extends through about 180° and a recessed portion which also extends through about 180° and which is recessed from the level of the raised portion by a distance corresponding to one half of the pitch of the heating elements. Thus, as the platen roller 12, which is in the position shown in FIG. 4, rotates 360°, the cam gear 22 rotates 180° and the follower roller 24 enters the recessed portion of the cam groove 26, resulting in the platen roller 12 being shifted rightward (as viewed in the figure) by a distance corresponding to one half of the pitch of the heating elements. Therefore, the recording head 16 is immovable in this embodiment. It is also possible in this embodiment to shift the platen roller 12 in a multiplicity of steps by varying the configuration of the cam groove 26 and the reduction ratio of the gear train 21. It will be understood from the foregoing description that the shifting means in the embodiment shown in FIG. 4 comprises a combination of the spring 25 and the cam groove 26.

According to the present invention, since a general-purpose recording head is employed, it is possible to increase the density of resulting images without bringing about a substantial rise in the production cost. Further, since the extent of heat interference between the heating elements is relatively small, it is possible to obtain an image of higher resolution than in the case of the arrangement wherein heating elements are disposed close together.

The invention has been described in detail with particular reference to preferred embodiments thereof, but it will be understood that variations and modifications can be effected within the spirit and scope of the invention.

What is claimed is:

1. A thermal recording apparatus comprising:

a recording head having a row of heating elements spaced at a pitch t;

means including a platen roller for supporting a sheet of recording paper adjacent to said recording head, said platen roller being supported for rotation and axial movement;

driving means for moving the sheet of recording paper in a direction substantially perpendicular to said row of heating elements;

means for shifting said platen roller relative to the sheet of recording paper in a direction parallel to said row of heating elements through a distance which is smaller than the pitch t of said heating elements; and wherein said shifting means includes a frame, and cam means disposed between said platen roller and said frame and adapted to axially move said platen roller every time said platen roller rotates one full turn.

* * * * *